(12) United States Patent
Cho et al.

(10) Patent No.: US 7,936,517 B2
(45) Date of Patent: May 3, 2011

(54) METHOD OF EXTRUSION MOLDING PRISM FILM AND PRISM FILM MANUFACTURED BY THE SAME

(75) Inventors: Gyu Chan Cho, Uiwang-si (KR); Jin Woo Lee, Uiwang-si (KR); Sun Hong Park, Uiwang-si (KR); Jong Kwan Kim, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 12/654,121

(22) Filed: Dec. 10, 2009

(65) Prior Publication Data
US 2010/0149648 A1    Jun. 17, 2010

(30) Foreign Application Priority Data
Dec. 15, 2008   (KR) .......................... 10-2008-0127358

(51) Int. Cl.
*G02B 27/10* (2006.01)
(52) U.S. Cl. ...................................................... 359/625
(58) Field of Classification Search ................. 359/618, 359/625, 606, 720
See application file for complete search history.

(56) References Cited

U.S. PATENT DOCUMENTS
6,870,674 B2 *   3/2005   Ookawa et al. ............... 359/455
* cited by examiner

*Primary Examiner* — Alicia M Harrington
(74) *Attorney, Agent, or Firm* — Lee & Morse, P.C.

(57) ABSTRACT

A method of extrusion molding a prism film and a prism film manufactured by the same, the method including providing a molten film, simultaneously forming a prism pattern and an embossed pattern on opposite surfaces of the molten film by passing the molten film through a gap between a prism roll and an emboss roll, and cooling the molten film having the prism pattern and the embossed pattern on opposite surfaces thereof.

17 Claims, 4 Drawing Sheets

METHOD OF EXTRUSION MOLDING PRISM FILM AND PRISM FILM MANUFACTURED BY THE SAME

BACKGROUND

1. Field

Embodiments relate to a method of extrusion molding a prism film and a prism film manufactured by the same.

2. Description of the Related Art

Recently, display systems, e.g., liquid crystal displays (LCDs), have been widely used as flat panel displays due to various advantageous features thereof, e.g., compactness, light weight, low power consumption, and so on. Further, use of LCDs has expanded to information display devices, e.g., mobile phones, personal digital assistants (PDAs), computers, televisions, OA devices, and the like. Depending on the use, LCDs may require various characteristics, e.g., high brightness, wide viewing angle, compactness, low weight, etc. In particular, uniform and high brightness may be desirable. Accordingly, some LCDs may employ patterned films, e.g., prism films, to focus light emitted from a backlight unit towards a viewer or to direct light in a desired direction.

However, prism films may be susceptible to damage during treatment or assembly thereof. Such damage may adversely affect the screen display, causing deterioration in image and other qualities. Further, an interference pattern may be generated due to a Moire phenomenon when other optical components, e.g., lattices or multiple-pattern films of a liquid crystal module, overlap one another.

A liquid crystal display may also employ a scratch-resistant lens film, which may be provided on a rear side thereof. The scratch resistant lens film may include a hard coating layer having a convex-concave pattern to provide an optical diffusion function. However, an additional process for forming the hard coating layer of the scratch-resistant lens film may increase manufacturing time and cost, thereby decreasing product yields.

SUMMARY

Embodiments are directed to a method of extrusion molding a prism film and a prism film manufactured by the same, which represent advances over the related art.

It is a feature of an embodiment to provide a scratch-resistant prism film that protects a surface and effectively conceals an outline of a light source.

It is another feature of an embodiment to provide a method of co-extruding a monolayer or multilayer prism film, by which a prism pattern and a non-prismatic embossed pattern are simultaneously formed on opposite surfaces of the prism film, thereby enabling a reduction in fabrication time and cost while increasing product yields.

At least one of the above and other features and advantages may be realized by providing a method of extrusion molding a prism film including providing a molten film, simultaneously forming a prism pattern and an embossed pattern on opposite surfaces of the molten film by passing the molten film through a gap between a prism roll and an emboss roll, and cooling the molten film having the prism pattern and the embossed pattern on opposite surfaces thereof.

The molten film may be a monolayer film formed from a base layer melt.

The molten film may be a double-layer film formed from a base layer melt having a first hard coating layer melt stacked on a surface thereof, and the prism pattern may be formed on a surface of the base layer melt and the embossed pattern may be formed on a surface of the hard coating layer melt.

The base layer melt may have a thickness of about 50 to about 150 µm and the first hard coating layer melt may have a thickness of about 5 to about 150 µm.

The molten film may be a triple-layer film formed from a base layer melt having a first hard coating layer melt stacked on a surface thereof and a second hard coating layer melt stacked on another surface of the base layer melt, the first and second hard coating layer melts themselves including surfaces, and the prism pattern may be formed on a surface of the second hard coating layer melt and the embossed pattern may be formed on a surface of the first hard coating layer melt.

The base layer melt may have a thickness of about 50 to about 150 µm and the first and second hard coating layer melts may each have thicknesses of about 5 to about 150 µm.

The method as claimed claim 1, wherein the emboss roll has a surface roughness Ra of about 0.6 to about 4 µm and a height distribution index (HDI) of about 3.5 to about 10 µm.

The prism roll and the emboss roll may be set at a temperature of about 120 to about 140° C.

The molten film may include a thermoplastic resin having a glass transition temperature of about 140° C. or greater.

The molten film may include a thermoplastic resin having a melt index (MI) of about 15 to about 100 at 250° C. and 10 kgf.

At least one of the above and other features and advantages may also be realized by providing a prism film produced by the method of an embodiment.

An embossed pattern plane of the prism film may have a surface roughness Ra of about 0.6 to about 4 µm and a height distribution index (HDI) of about 3.5 to about 10 µm.

A prism pattern plane of the prism film may have a transfer ratio of a prism height of about 85 to about 100% and may include a prism having a vertex rounded to have a radius of about 0 to about 20 µm.

The prism film may include a thermoplastic resin having a glass transition temperature of about 140° C. or greater.

The prism film may include a thermoplastic resin having a melt index (MI) of about 15 to about 100 at 250° C. and 10 kgf.

The base layer melt may have a thickness of about 50 to about 150 µm, and the first hard coating layer melt may have a thickness of about 5 to about 150 µm.

The base layer melt may have a thickness of about 50 to about 150 µm, and the first and second hard coating layers may each have a thickness of about 5 to about 150 µm.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2008-0127358, filed on Dec. 15, 2008, in the Korean Intellectual Property Office, and entitled: "Extrusion Molding Method of Prism Film and Prism Film Manufactured by the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
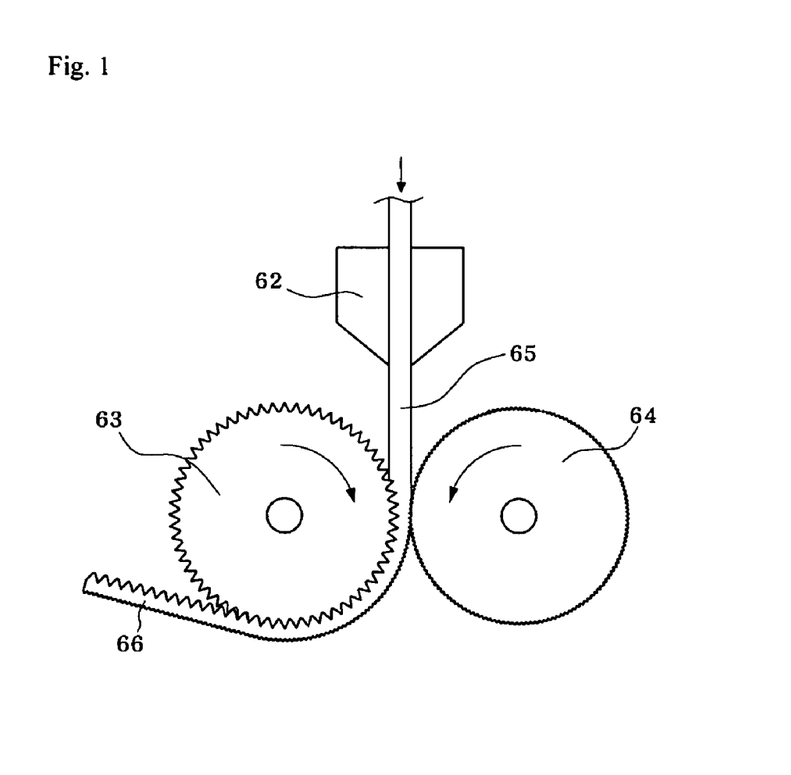
FIG. 1 illustrates a cross-sectional view of a prism roll and an emboss roll for simultaneously forming a prism pattern and an embossed pattern in a process of fabricating a prism film according to an embodiment.

Hereinafter, an extrusion molding method according to an embodiment will be described in detail. First, referring to FIG. 1, a molten monolayer film 65 may be prepared from a base layer melt. A resin for the base layer melt and additives may be melted and kneaded to form the base layer melt. Then, the base layer melt may be supplied to a T-die 62 to form the molten monolayer film 65, as illustrated in FIG. 1. Then, the molten monolayer film 65 may pass through a gap between a prism roll 63 having a prism pattern thereon and an emboss roll 64 having an embossed pattern thereon, to transfer the prism pattern and the embossed pattern to opposite surfaces of the molten monolayer film 65, respectively, to form a molten monolayer prism film 66. In an implementation, the prism pattern and the embossed pattern may be simultaneously formed on opposite surfaces of the molten monolayer film 65, respectively. Then, the molten monolayer prism film 66 having the prism pattern and the embossed pattern on the opposite surfaces thereof may be subjected to a cooling and curing process, thereby forming a prism film having the prism pattern and the embossed pattern respectively formed on opposite surfaces thereof.

Figure 2:
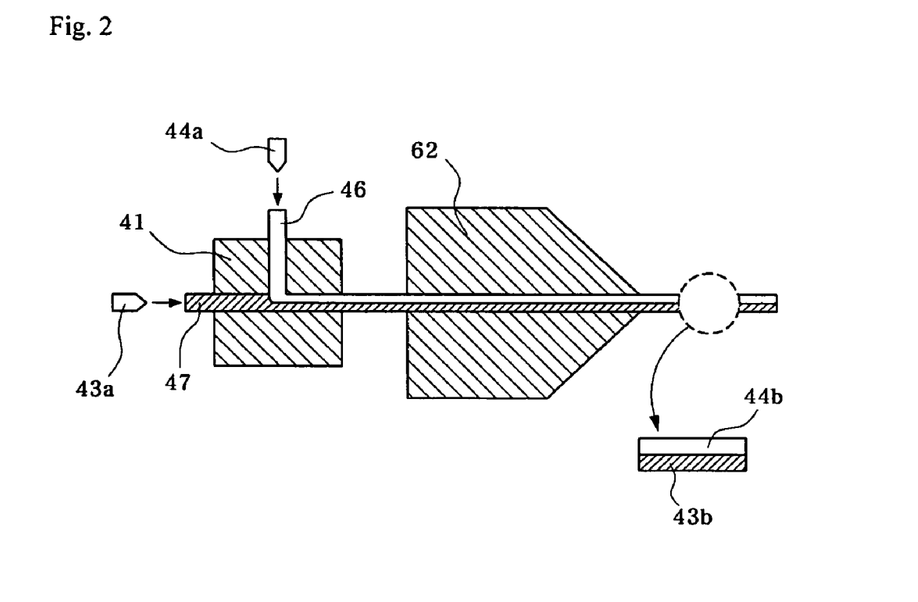
FIG. 2 illustrates a cross-sectional view of a flow of a double-layer resin melt in a prism feed block according to an embodiment.

Another embodiment will be described with reference to FIG. 2. In the present embodiment, a prism film may be formed through a co-extrusion molding method. First, a molten double-layer film may be prepared from a base layer melt 43b having a first hard coating layer 44b stacked on a surface thereof. Specifically, resins for a base layer melt 43a and a first hard coating layer melt 44a may be separately melted and then kneaded with additives. Alternatively, the resins for the base layer melt 43a and the first hard coating layer melt 44a may be separately melted along with the additives, followed by kneading. Then, as illustrated in FIG. 2, the base layer melt 43a and the first hard coating layer melt 44a may be supplied to a feed block die 41 or a multi-manifold die to be stacked into a double-layer melt. In other words, the first hard coating layer melt 44a may be poured into a first inlet 46 of the feed block die 41 and the base layer melt 43a may be poured into a second inlet 47 of the feed block die 41. Then, similar to the embodiment illustrated in FIG. 1, the double-layer melt may be supplied to the T-die 62 to form a molten double-layer film including the base layer 43b and a first hard coating layer 44b. Then, to form a prism pattern and an embossed pattern on opposite surfaces of the molten double-layer film, respectively, the molten double-layer film may be passed through a gap between the prism roll 63 having the prism pattern disposed thereon and the emboss roll 64 having the embossed pattern disposed thereon. In an implementation, the prism pattern may be transferred to a surface of the base layer 43b and the embossed pattern may be transferred to a surface of the first hard coating layer 44b, to form a molten double layer prism film. Then, the molten double-layer prism film having the prism pattern and the embossed pattern on the opposite surfaces thereof may be subjected to a cooling and curing process, thereby forming a prism film having the prism pattern and the embossed pattern respectively formed on opposite surfaces thereof.

Figure 3:
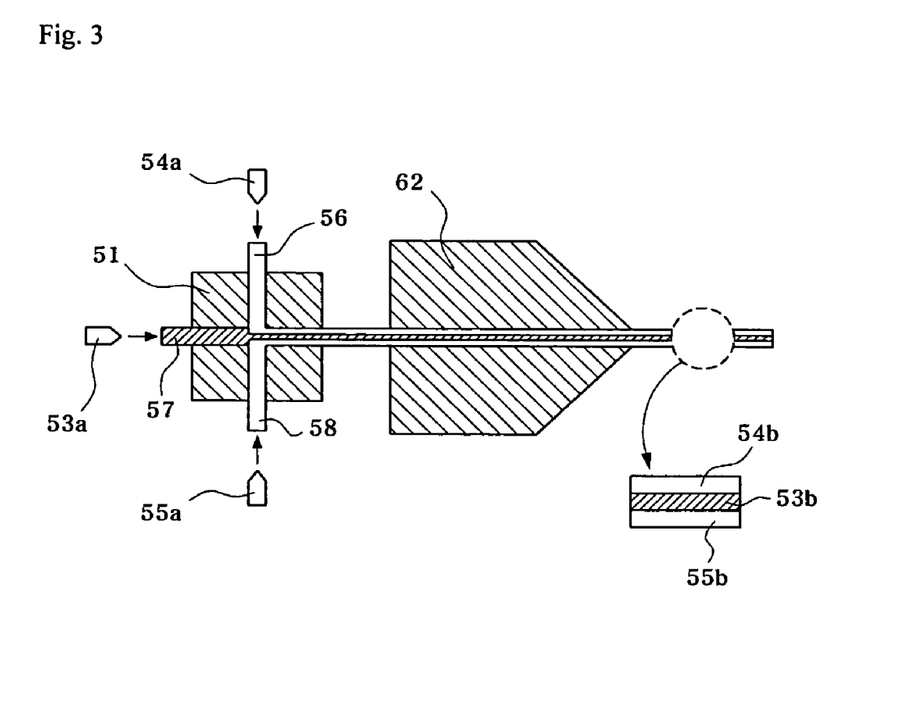
FIG. 3 illustrates a cross-sectional view of a flow of a triple-layer resin melt in a prism feed block according to an embodiment.

Another embodiment will be described referring to FIG. 3. In the present embodiment, a prism film may be formed through a co-extrusion molding method. First, a molten triple-layer film may be prepared from a base layer 53b having a first hard coating layer 54b on a surface thereof and a second hard coating layer 55b on another surface thereof. Specifically, resins for a base layer melt 53a, a first hard coating layer melt 54a, and a second hard coating layer melt 55a may be separately melted and then kneaded with additives. Alternatively, the resins for the base layer melt 53a, the first hard coating layer melt 54a, and the second hard coating layer melt 55a may be separately melted along with the additives, followed by kneading. Then, as illustrated in FIG. 3, the base layer melt 53a, the first hard coating layer melt 54a, and the second hard coating layer melt 55a may be supplied to a feed block die 51 to be stacked into a triple-layer melt. Alternatively, a multi-manifold die may be used to form the triple-layer melt. In other words, the first hard coating layer melt 54a may be poured into a first inlet 56 of the feed block die 51, the base layer melt 53a may be poured into a second inlet 57 thereof, and the second hard coating layer melt 55a may be poured into a third inlet 58 thereof. Here, the triple-layer melt may include a laminate that is formed by stacking the first and second hard coating layer melts 54a, 55a on opposite sides of the base layer melt 53a, respectively. Then, similar to the embodiment illustrated in FIG. 1, the triple-layer melt may be supplied to the T-die 62 to form a molten triple-layer film including the base layer 53b, first hard coating layer 54b, and second hard coating layer 55b. Then, to form a prism pattern and an embossed pattern on opposite surfaces of the molten triple-layer film 65, respectively, the molten triple-layer film may be passed through a gap between the prism roll 63 having the prism pattern disposed thereon and the emboss roll 64 having the embossed pattern disposed thereon. Here, the prism pattern and the embossed pattern may be formed on opposite surfaces of the molten triple-layer film. In an implementation, the prism pattern may be transferred to a surface of the second hard coating layer 55b and the embossed pattern may be transferred to a surface of the first hard coating layer 54b to form a triple-layer prism film. Then, the molten triple-layer prism film having the prism pattern and the embossed pattern formed on the opposite surfaces thereof may be subjected to a cooling and curing process, thereby forming a prism film having the prism pattern and the embossed pattern respectively formed on opposite surfaces thereof.

Figure 4:
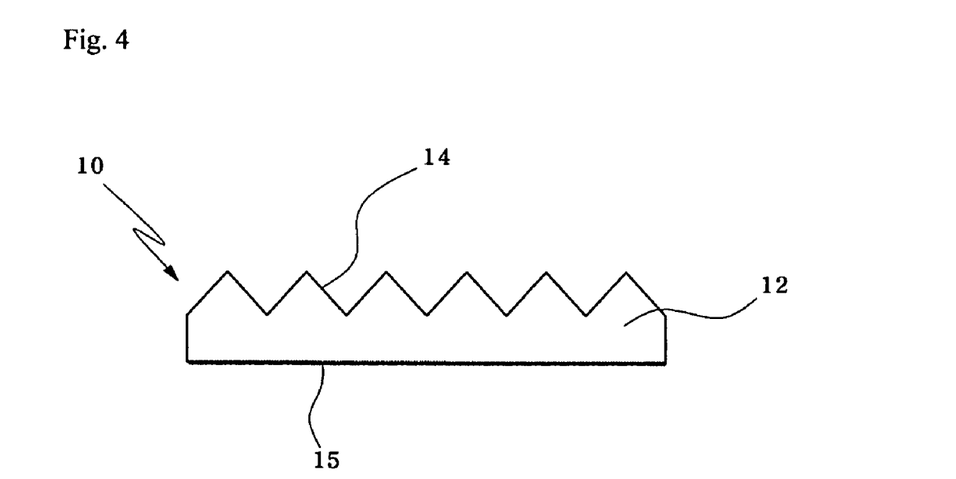
FIG. 4 illustrates a cross-sectional view of a monolayer prism film having a prism pattern and an embossed pattern simultaneously formed on opposite surfaces thereof by a melt extrusion molding method according to an embodiment.

A prism film according to an embodiment will now be described in detail. Referring to FIG. 4, a monolayer film 10 prepared by the method described above may have a prism pattern 14 and an embossed pattern 15 on opposite surfaces of a base layer 12, respectively. When the prism film is formed from a monolayer film using a single material as described above, the prism film may have advantages over a prism film formed from a multilayer film using different materials. Specifically, the monolayer film may not suffer undesirable dimensional deformation and film bending when the film is subjected to repetitious heating and cooling inside a backlight unit.

Figure 5:
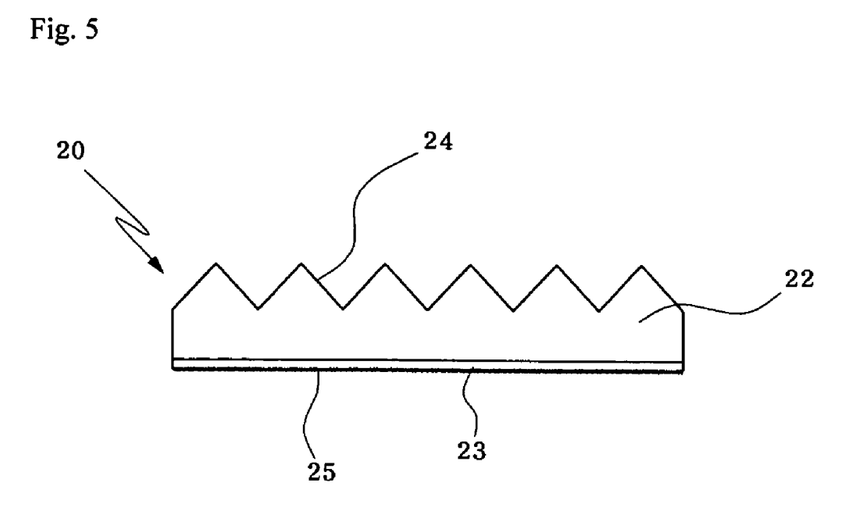
FIG. 5 illustrates a cross-sectional view of a double-layer prism film having a prism pattern and an embossed pattern simultaneously formed thereon by a melt co-extrusion molding method according to an embodiment.

A prism film according to another embodiment will now be described in detail. Referring to FIG. 5, a double-layer film 20 prepared by the method described above may include a base layer 22 and a first hard coating layer 23. The base layer 22 may be formed with a prism pattern 24 and the first hard coating layer 23 may be formed with an embossed pattern 25.

Figure 6:
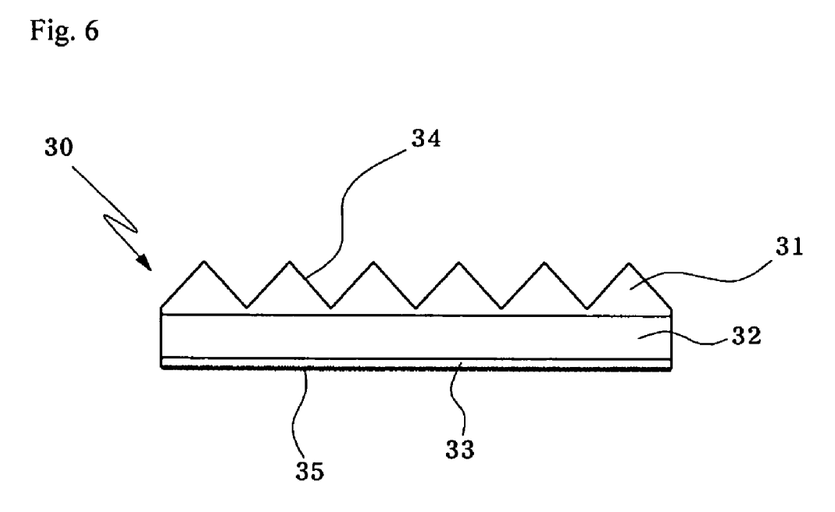
FIG. 6 illustrates a cross-sectional view of a triple-layer prism film having a prism pattern and an embossed pattern simultaneously formed thereon by a melt co-extrusion molding method according to an embodiment.

A prism film according to yet another embodiment will now be described in detail. Referring to FIG. 6, a triple-layer film 30 prepared by the method described above may include first and second hard coating layers 33 and 31 on opposite surfaces of a base layer 32, respectively. The second hard coating layer 31 may be formed with a prism pattern 34 and the first hard coating layer 33 may be formed with an embossed pattern 35.

Hereinafter, common features of the embodiments will be described in detail. After the resin for the first hard coating layer melt 44a or 54a is poured into the first inlet 46 or 56 of the T die 62, the first hard coating layer melt 44a or 54a may be extruded at about 230 to about 250° C. In an implementation, extrusion of the first hard coating layer melt 44a or 54a may be performed at about 240° C. Maintaining the extrusion temperature at about 230° C. or greater may help ensure that resin melt viscosity does not increase, advantageously avoiding extrusion instability, pattern transfer defects, and so on. Maintaining the extrusion temperature at about 250° C. or less may help ensure that excessive heat does not cause, e.g., resin carbonization, discoloration, or the like. Extrusion of the second hard coating melt 55a after the resin for the second hard coating melt 55a is poured into the third inlet 58 of the T-die 62 may also be performed at about 230 to about 250° C.

After the resin for the base layer melt 43a or 53a is poured into the second inlet 47 or 57 of the T die 62, the base layer melt 43a or 53a may be extruded at about 270 to about 295° C. In an implementation, extrusion of the base layer melt 43a or 53a may be performed at about 290° C. Maintaining the extrusion temperature at about 270° C. or greater may help ensure that resin melt viscosity does not increase, advantageously avoiding extrusion instability, pattern transfer defects, and the like. Maintaining the extrusion temperature at about 295° C. or less may help ensure that excessive heat does not cause, e.g., resin carbonization, discoloration, or the like.

The prism roll 63 and the emboss roll 64 may be set at a temperature of about 120 to about 140° C. In an implementation, the prism roll 63 and the emboss roll 64 may be set at a temperature of about 135° C. Maintaining the set temperature of the prism roll 63 and the emboss roll 64 at about 120° C. or greater may help ensure that a pattern transfer ratio is not lowered. Maintaining the set temperature of the prism roll 63 and the emboss roll 64 at about 140° C. or less may help ensure that the resin does not stick to surfaces of the rolls, advantageously avoiding formation of a releasing line of a transverse line pattern on the resin when the resin is separated from the rolls.

A nipping pressure between the prism roll 63 and the emboss roll 64 may be about 30 to about 90 bars. In an implementation, the nipping pressure between the prism roll 63 and the emboss roll 64 may be about 50 bars. Maintaining the nipping pressure at about 30 bars or greater may help ensure that the pattern transfer ratio is not degraded. Maintaining the nipping pressure at about 90 bars or less may help avoid undesirable equipment instability.

While passing through the gap between the prism roll 63 and the emboss roll 64, the molten monolayer, double-layer, or triple-layer film may be extruded at a velocity (or surface linear velocity of the prism and emboss rolls) of about 5 to about 10 m/min. Maintaining the extrusion velocity at about 5 m/min or greater may help ensure that the pattern transfer ratio does not deteriorate. Maintaining the extrusion velocity at about 10 m/min or less may help avoid equipment instability.

Figure 7:
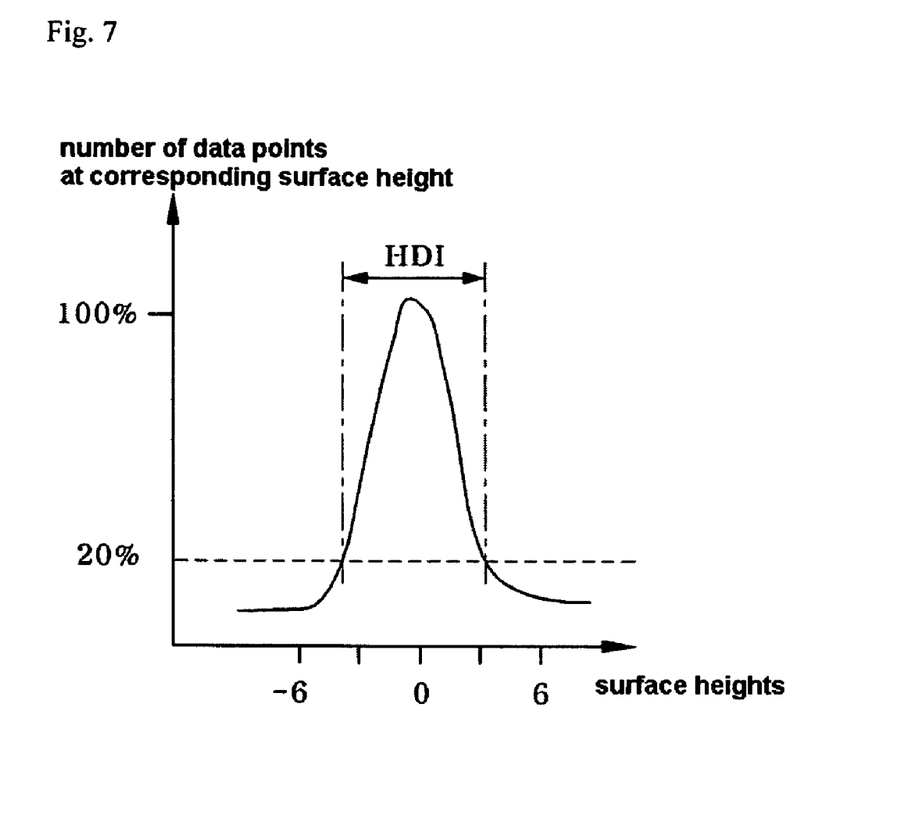
FIG. 7 illustrates a graph depicting a distribution of surface height data of specimens.

The embossed pattern 15, 25, or 35, which pattern is other than and different from the prism pattern, may be formed on the surface of the prism film opposite the surface on which the prism pattern 14, 24, or 34 is formed. The surface having the embossed pattern 15, 25, or 35 may be an optical diffusion plane. The optical diffusion plane may be arranged as a light entrance plane in a backlight unit. The embossed pattern may have a convex-concave configuration and may provide superior optical diffusion properties to the prism film. Thus, the embossed pattern may prevent non-uniform brightness of light sources arranged in a spot or linear manner from appearing as silhouettes of the light sources on a screen. The surface of the emboss roll 64 may be subjected to sand blasting to form the embossed pattern 15, 25, or 35 on a surface of the prism film, thereby creating randomly distributed peaks and valleys of substantially less dimensional magnitude than those of the prisms constituting the prism pattern. The surface of the emboss roll 64 may have a surface roughness Ra of about 0.6 to about 4 μm and a height distribution index (HDI) of about 3.5 to about 10 μm. Further, the embossed pattern 15, 25, or 35 on the surface of the prism film may have a surface roughness Ra of about 0.6 to about 4 μm and an HDI of about 3.5 to about 10 μm. Maintaining the surface roughness Ra of the prism film at about 0.6 μm or greater and the HDI of the prism film at about 3.5 μm or greater may help ensure uniform diffusion of light. Maintaining the surface roughness Ra at about 4 μm or less and the HDI at about 10 μm or less may help ensure that overall light transmittance of the prism film is not lowered and does not undergo partial variation. Herein, the height distribution index (HDI) is defined as a main distribution width of surface heights in a surface height distribution curve obtained by surface roughness analysis. FIG. 7 illustrates distribution of surface-height data of specimens. In FIG. 7, the x-axis indicates individual surface heights and the y-axis indicates the number of data points at corresponding surface heights. Herein, the HDI is a distribution width of surface heights within 20% of surface heights pertaining to a highest distribution region in a unit area of 600×480 μm. This can be expressed by the main distribution width of surface heights obtained using a profiler from Wyko Industrial Services Limited.

Figure 8:
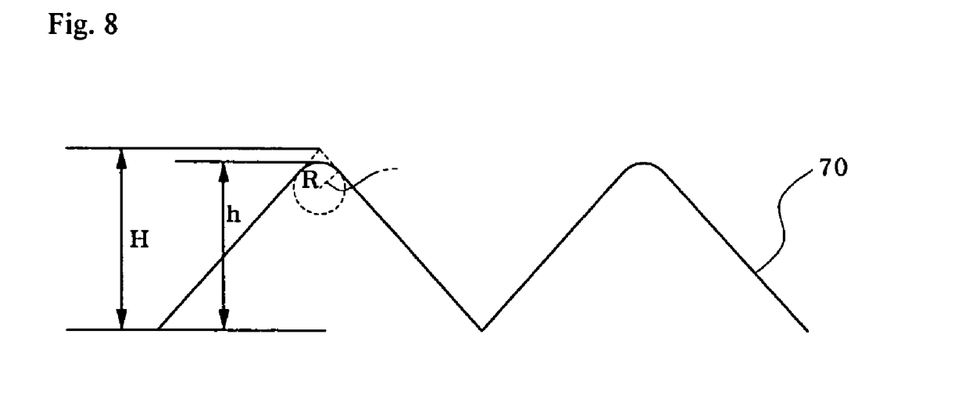
FIG. 8 illustrates a cross-sectional view of prisms according to an embodiment.

Referring to FIG. 8, each prism 70 of the prism pattern 14, 24, or 34 formed on the prism film by the prism roll 64 may have an isosceles triangular shape and a vertex angle of about 80 to about 110 degrees. Each prism 70 may adjoin other prisms 70 in the prism pattern 14, 24, or 34. To effectively focus light entering lower surfaces of the prisms, the prisms may have a vertex angle of about 80 to about 110 degrees. A prism pitch between vertices of adjoining prisms may be about 50 to about 200 μm. Maintaining the pitch at about 50 μm or greater may help ensure ease forming prisms having a desired height by the melt extrusion method. Maintaining the pitch at about 200 μm or less may help ensure that an interference pattern is generated depending on a lattice of a liquid crystal module.

As illustrated in FIG. 8, a transfer ratio of a prism height is defined as a value obtained by dividing an actual prism height (h) by a theoretical prism height (H) at a vertex angle (i.e. a height at 100% transfer ratio) according to the following equation.

$$\text{Transfer ratio}(\%) = (h/H) \times 100$$

It is not necessary for the prism film prepared by the melt extrusion method to have a transfer ratio of 100%. However, maintaining the transfer ratio at about 85% or greater may help ensure that the prism film is able to efficiently focus light towards upper surfaces of the prisms when the light enters the lower surfaces of the prisms. Accordingly, the prism film may have a transfer ratio of about 85 to about 100%. If the transfer ratio is 100%, the vertex of the prism is not rounded at all. In contrast, if the transfer ratio is less than 100%, the prism has a rounded vertex, a radius of which may be about 0 to about 20 μm depending on the prism pitch between the vertices of the prisms.

Resins for the base layer melt 43a or 53a, the first hard coating layer melt 44a or 54a, and the second hard coating layer melt 55a may be, e.g., highly transparent thermoplastic resins or compositions thereof that are capable of being processed by melt extrusion molding. The resins may include, e.g., polyacetal resin, acrylic resin, polycarbonate resin, styrene resin, polyester resin, vinyl resin, polyphenylene ether resin, polyolefin resin, acrylonitrile-butadiene-styrene (ABS) copolymer resin, polyarylate resin, polyarylsulfone resin, polyethersulfone resin, polyphenylene sulfide resin, and/or fluorinated resin.

In an implementation, the resins for the base layer melt 43a or 53a, the first hard coating layer melt 44a or 54a, and the second hard coating layer melt 55a may include transparent polymer resins, e.g., polycarbonate resin, styrene resin, and/or cycloolefin-based resin.

In another implementation, the resin for the base layer melt 43a or 53a may include, e.g., aromatic polycarbonate (PC) having a weight average molecular weight of about 15,000 to about 40,000. The resins for the first hard coating layer melt 44a or 54a and the second hard coating layer melt 55a may each include, e.g., polymethylmethacrylate (PMMA) having a weight average molecular weight of about 30,000 to about 300,000. In an implementation, the resins for the first hard coating layer melt 54a and the second hard coating layer melt 55a may be the same.

Further, the resins for the base layer melt 43a or 53a, the first hard coating layer melt 44a or 54a, and the second hard coating layer melt 55a may include additives, e.g., UV-absorbents, heat stabilizers, flame retardants, lubricants, dyes pigments, and the like.

Since the prism film may be subjected to repetitious heating and cooling by light sources in the backlight unit, it may be necessary for the prism film to have heat resistance. Therefore, the thermoplastic resins according to an embodiment may have a glass transition temperature (Tg) of about 140° C. or greater. Further, in order to produce the prism film by the melt extrusion method according to an embodiment, the thermoplastic resins may have a melt index (MI) of about 15 to about 100 at 250° C. and 10 kgf. Maintaining the melt index (MI) at about 15 or greater may help ensure that the viscosity of the molten resin does not excessively increase, thereby ensuring ease of forming a prism or embossed pattern using a pattern roll. Maintaining the melt index at about 100 or less may help ensure that the viscosity of the molten resin is not excessively lowered, thereby ensuring ease of producing the film.

The prism film may be a thin film for effectively focusing light in a vertical direction when light from the light sources enters a lower surface of the prism film. The prism film may have a thickness of about 100 to about 500 μm. Maintaining the thickness of the prism film at about 100 μm or greater may help ensure that rigidity of the prism film is not lowered, thereby ensuring ease of manipulating and assembly of the prism film. Maintaining the thickness of the prism film at about 500 μm may help ensure that the overall thickness of the prism film does not increase, thereby achieving desired compactness of a liquid crystal device. The first hard coating layer 44b or 54b and the second hard coating layer 55b may conceal screen defects caused by, e.g., scratches or foreign matter on the surface of the prism film. Each of the first hard coating layer 44b or 54b and the second hard coating layer 55b may have a thickness of about 5 to about 150 μm. The base layer 43b or 53b may have a thickness of about 50 to about 150 μm. Maintaining the thicknesses of the base layer 43b or 53b, the first hard coating layer 44b or 54b, or the second hard coating layer 55b greater than the above amounts may help ensure that there is minimal thickness difference between resin layers of the multilayer prism film, thereby avoiding interface instability during manufacture of the prism film and providing a surface protection function to the prism film. Maintaining the thicknesses below the above amounts may help ensure that the overall thickness of the prism film does not increase.

The configuration and operation of the embodiments will be described in more detail with reference to the following Examples. It should be noted that the following Examples are given by way of illustration and should not be construed to limit the scope in any sense. Moreover, the Comparative Examples are set forth to highlight certain characteristics of certain embodiments and are not to be construed as either limiting the scope of the invention as exemplified in the Examples or as necessarily always being outside the scope of the invention in every respect.

Evaluations of Examples were carried out as follows.

1. Front brightness: With a diffuser plate and a prism film sequentially disposed above a light source, brightness of the prism film was measured at a right angle to a plane of the prism film using an ELDIM EZ-contrast system.

2. Light source visibility: With a diffuser plate and a prism film sequentially disposed above a light source, light source visibility was determined according to whether an outline of the light source was observed (O indicates that the outline was observed, and X indicates that the outline was not observed).

3. Sheet deformation: With a linear fluorescent lamp disposed at an angle above a prism film, sheet deformation was determined according to whether the fluorescent lamp was appeared bent on the prism film (O indicates that the fluorescent lamp was appeared bent, and X indicates that the fluorescent lamp was appeared linear).

4. Pencil hardness: After scratching a surface of a specimen using a load of 1 kgf/cm$^2$ at an inclination of 45 degrees at room temperature in accordance with JIS-K-5400, pencil hardness of the specimen was measured based on a degree of scratching observed with the naked eye. When pencil scratch occurred on the surface of the specimen, the pencil hardness was determined between 4B~4H.

Example 1-1

A prism film for an LCD-TV backlight unit was prepared according to an embodiment as follows. In a φ65 single-screw extruder, polycarbonate (PC) (Wonderlite PC-122 available from Chi Mei Corporation) was melted to form a resin melt. The resin melt was in turn extruded through the T-die 62 and passed through a gap between the prism roll 64 and the emboss roll 63, thereby forming a prism film. The prism film included prisms having a vertex angle of 90 degrees, a prism pitch of 100 μm, and a transfer ratio of 95% at one side thereof. The other side of the prism film, i.e., an embossed pattern plane, had a surface roughness Ra of 1.63 μm and an HDI of 7.51 μm.

Example 1-2

Example 1-2 was prepared and evaluated by the same method as that for Example 1-1 except that an embossed pattern plane of the prism film had a surface roughness Ra of 2.31 μm and an HDI of 6.36 μm.

Comparative Example 1-1

Comparative Example 1-1 was prepared and evaluated by the same method as that for Example 1-1 except that it was prepared using a mirror image roll having no embossed pattern, instead of the emboss roll 64. In other words, the surface opposite to the prism surface had a flat, planar surface.

Comparative Example 1-2

Comparative Example 1-2 was prepared and evaluated by the same method as that for Example 1-1 except that the prism film was formed with prisms having a vertex angle of 130 degrees and was prepared using a mirror image roll having no embossed pattern instead of the emboss roll 64.

Comparative Example 1-3

Comparative Example 1-3 was prepared and evaluated by the same method as that for Example 1-1 except that an embossed pattern plane of the prism film had a surface roughness Ra of 3.3 μm and an HDI of 15 μm.

Comparative Example 1-4

Comparative Example 1-4 was prepared and evaluated by the same method as that for Example 1-1 except that the prism film had a prism pitch of 300 μm.

Comparative Example 1-5

Comparative Example 1-5 was prepared and evaluated by the same method as that for Example 1-1 except that the prism film had a transfer ratio of 70%.

Comparative Example 1-6

Comparative Example 1-6 was prepared and evaluated by the same method as that for Example 1-1 except that PC (LEXAN OQ1020-112 available from SABIC) was used instead of PC (Wonderlite PC-122 available from Chi Mei Corporation).

Comparative Example 1-7

Comparative Example 1-7 was prepared and evaluated by the same method as that for Example 1-1 except that PMMA (Sumipex EX-N available from Sumitomo Chemical Ltd.) was used instead of PC (Wonderlite PC-122 available from Chi Mei Corporation).

The structure and properties of the Examples and Comparative Examples are shown in Table 1. The front brightness and the light source visibility of the prism film were measured using a light source and a luminance meter. The results are shown in Table 2.

TABLE 1

Surface structure and physical properties of prism film

| | Prism pattern plane | | | Embossed pattern plane | | Resin | |
|---|---|---|---|---|---|---|---|
| | Vertex angle | Pitch | Transfer ratio | Ra | HDI | Tg | MI |
| E1-1 | 90 | 100 | 95 | 1.63 | 7.51 | 148.5 | 35 |
| E1-2 | 90 | 150 | 95 | 2.13 | 6.36 | 148.5 | 35 |
| CE1-1 | 90 | 100 | 95 | planar | — | 148.5 | 35 |
| CE1-2 | 130 | 100 | 95 | planar | — | 148.5 | 35 |
| CE1-3 | 90 | 100 | 95 | 3.3 | 15 | 148.5 | 35 |
| CE1-4 | 90 | 300 | 95 | 1.63 | 7.51 | 148.5 | 35 |
| CE1-5 | 90 | 100 | 70 | 1.63 | 7.51 | 148.5 | 35 |
| CE1-6 | — | — | — | — | — | 149 | 105 |
| CE1-7 | 90 | 100 | 95 | 1.63 | 7.51 | 119.3 | 1.67(*) |

(*)230° C., 3.8 kgf

TABLE 2

Evaluation results of Examples and Comparative Examples

| | Front brightness (cd/cm$^2$) | Light source discrimination | Sheet deformation |
|---|---|---|---|
| E 1-1 | 9840 | X | X |
| E 1-2 | 9865 | X | X |
| CE 1-1 | 9870 | ○ | X |
| CE 1-2 | 9510 | ○ | X |
| CE 1-3 | 9430 | X | X |
| CE 1-4 | 9810 | X | X |
| CE 1-5 | 8510 | X | X |
| CE 1-6 | — | — | — |
| CE 1-7 | 9845 | X | ○ |

In Table 2, it may be seen that the prism films of Examples 1-1 and 1-2 did not show the outline of the light source, as compared with Comparative Examples 1-1 and 1-2 in which an opposite plane of the prism pattern plane had a smooth, i.e., planar surface.

In Comparative Example 1-2 which had a vertex angle of the prism of 130 degrees and in which the opposite plane of the prism plane was the mirror image plane, the front brightness was low and the outline of the light source was observed. Further, in Comparative Example 1-3 in which the embossed pattern plane had an HDI of 15 μm, the front brightness was low due to, e.g., a decrease of overall light transmittance. In Comparative Example 1-4 which had a prism pitch of 300 μm, the front brightness was high and the outline of the light source was not observed. Comparative Example 1-4 exhibited an interference pattern caused by a lattice of a liquid crystal module. In Comparative Example 1-5 which had a transfer ratio of 70%, the light focusing effect of the prism was deteriorated, thereby significantly decreasing the front brightness. In Comparative Example 1-6 in which the resin had an MI (250° C., 10 kgf) of 103, the viscosity was low, thereby making it difficult to fabricate the film. In Comparative Example 1-7 in which the resin had a glass transition temperature of 119.3° C., the prism film had low heat resistance, resulting in sheet deformation during heating.

Example 2-1

A prism film for an LCD-TV backlight unit was prepared according to another embodiment as follows. PC (Wonderlite PC-110K available from Chi Mei Corporation) was melted in a φ65 single-screw extruder to form a base layer 43b. PMMA (Product name: EX-N available from Sumitomo Chemical Ltd.) was melted in a φ40 single-screw extruder to form a first hard coating layer 44b. Then, a resin melt flow was formed to place a PMMA layer on one surface of a PC layer in a feed block 41 for a heterogeneous double-layer. Then, the resin melt was extruded through the T-die 62 attached to the feed block 41 and passed through a gap between the prism roll 64 and the emboss roll 63, thereby forming a prism film. The prism film included prisms having a vertex angle of 90 degrees and a prism pitch of 100 μm at one side thereof. The other side of the prism film, i.e., an embossed pattern plane, had a surface roughness Ra of 1.65 μm and an HDI of 7.63. The thickness of the PC layer was adjusted to 100 μm and the thickness of the PMMA layer was adjusted to 50 μm.

Example 2-2

Example 2-2 was prepared and evaluated by the same method as that for Example 2-1 except that an embossed pattern plane of the prism film had a surface roughness Ra of 2.20 μm and an HDI of 6.31 μm.

Example 2-3

Example 2-3 was prepared and evaluated by the same method as that for Example 2-1 except that prisms of the prism film had a vertex angle of 100 degrees.

Example 2-4

Example 2-4 was prepared and evaluated by the same method as that for Example 2-1 except that the base layer had a thickness of 100 μm, the first hard coating layer had a thickness of 50 μm, and the prism pitch was 196 μm.

Example 2-5

Example 2-5 was prepared and evaluated by the same method as that for Example 2-1 except that the PMMA layer was divided into two layers to be located on upper and lower surfaces of the PC layer in the feed block 41. Then, the layers were extruded to form a triple-layer prism film having 70/60/20 μm thick layers.

Example 2-6

Example 2-6 was prepared and evaluated by the same method as that for Example 2-5 except that the prism film had 150/150/50 μm thick layers and a prism pitch of 196 μm.

Comparative Example 2-1

Comparative Example 2-1 was by the same method as that for Example 2-1 except that the prism film was prepared using only the φ65 single-screw extruder without the φ40 single-screw extruder and was composed of a single PC layer having a thickness of 150 μm.

Comparative Example 2-2

Comparative Example 2-2 was prepared and evaluated by the same method as that for Example 2-1 except that it was prepared using a mirror image roll having no embossed pattern instead of the emboss roll.

Comparative Example 2-3

Comparative Example 2-3 was prepared and evaluated by the same method as that for Example 2-1 except that an embossed pattern plane of the prism film had a surface roughness Ra of 3.51 μm and an HDI of 16.82 μm.

Comparative Example 2-4

Comparative Example 2-4 was prepared and evaluated by the same method as that for Example 2-1 except that prisms of the prism film had a vertex angle of 130 degrees.

Comparative Example 2-5

Comparative Example 2-5 was prepared and evaluated by the same method as that for Example 2-1 except that the base layer had a thickness of 147 μm and the first hard coating layer had a thickness of 3 μm. The base layer was formed with no prism pattern and embossed pattern due to interface instability.

The structure and properties of the Examples and Comparative Examples are shown in Table 3. The front brightness and the light source visibility of the prism film were measured using a light source and a luminance meter. The results are shown in Table 4.

TABLE 3

Surface structure and physical properties of prism film

| | | | Prism pattern | | | | Resin/Tg | |
| | | | | plane | | Embossed | | Hard |
| | Layer structure | Layer thickness | Vertex angle | Pitch | Ra | HDI | Prism layer | coating layer |
|---|---|---|---|---|---|---|---|---|
| E2-1 | Double-layer | 130/20 | 90 | 100 | 1.63 | 7.51 | PC/ 148.5° C. | PMMA/ 104.8° C. |
| E2-2 | Double-layer | 130/20 | 90 | 100 | 2.20 | 6.31 | PC/ 148.5° C. | PMMA/ 104.8° C. |
| E2-3 | Double-layer | 130/20 | 100 | 100 | 1.63 | 7.51 | PC/ 148.5° C. | PMMA/ 104.8° C. |
| E2-4 | Double-layer | 100/50 | 90 | 196 | 1.63 | 7.51 | PC/ 148.5° C. | PMMA/ 104.8° C. |

TABLE 3-continued

Surface structure and physical properties of prism film

| | | Prism pattern | | | | Resin/Tg | |
| | | | plane | | Embossed | | Hard |
| | Layer | Layer | Vertex | | pattern plane | Prism | coating |
| | structure | thickness | angle | Pitch | Ra | HDI | layer | layer |
| --- | --- | --- | --- | --- | --- | --- | --- | --- |
| E2-5 | Triple-layer | 70/60/20 | 90 | 100 | 1.63 | 7.51 | PC/148.5° C. | PMMA/104.8° C. |
| E2-6 | Triple-layer | 150/150/50 | 90 | 196 | 1.63 | 7.51 | PC/148.5° C. | PMMA/104.8° C. |
| CE2-1 | Monolayer | 150 | 90 | 100 | 1.63 | 7.51 | PC/148.5° C. | — |
| CE2-2 | Double-layer | 130/20 | 90 | 100 | Planar | — | PC/148.5° C. | PMMA/104.8° C. |
| CE2-3 | Double-layer | 130/20 | 90 | 100 | 3.51 | 16.82 | PC/148.5° C. | PMMA/104.8° C. |
| CE2-4 | Double-layer | 130/20 | 130 | 100 | 1.63 | 7.51 | PC/148.5° C. | PMMA/104.8° C. |
| CE2-5 | Double-layer | 147/3 | 90 | 100 | — | — | PC/148.5° C. | PMMA/104.8° C. |

TABLE 4

Evaluation results of Examples and Comparative Examples

| | Front brightness (cd/cm$^2$) | Light source discrimination | Sheet deformation |
| --- | --- | --- | --- |
| E 2-1 | 9837 | 2H | X |
| E 2-2 | 9835 | 2H | X |
| E 2-3 | 9840 | 2H | X |
| E 2-4 | 9812 | 3H | X |
| E 2-5 | 9836 | 2H | X |
| E 2-6 | 9831 | 3H | X |
| CE 2-1 | 9832 | 2B | X |
| CE 2-2 | 9685 | 2H | O |
| CE 2-3 | 9210 | 2H | X |
| CE 2-4 | 9325 | 2H | X |
| CE 2-5 | — | — | — |

In Table 4, it may be seen that the prism films of Examples 2-1 and 2-2 did not show the outline of the light source, as compared with the prism film (Comparative Example 2-2) in which an opposite plane of the prism pattern plane had a planar surface. In Comparative Example 2-1 which had no hard coating layer, the prism film had a low pencil hardness. Therefore, it could be expected that scratches would be easily formed on the prism film. In Comparative Example 2-3 in which the embossed pattern plane had an HDI of 16.82 μm, the front brightness was low due to, e.g., a decrease of overall light transmittance. In Comparative Example 2-4, which had a vertex angle of 130 degrees, the light focusing effect of the prisms was deteriorated, thereby decreasing the front brightness. In Comparative Example 2-5, in which the hard coating layer had a thickness of 3 μm, interface instability occurred during manufacture of the prism film due to, e.g., thickness differences between the resin layers of the prism film, so that the prism film did not have desired properties.

As is apparent from the above description, according to an embodiment, a monolayer prism film may beneficially improve brightness of a liquid crystal display module via enhancement in efficiency of light utility and may efficiently conceal an outline of a light source. Further, according to the embodiment, since the prism film may be formed of a single material, the prism film may not suffer from dimensional deformation and film bending inside a backlight unit.

According to another embodiment, the multilayer scratch-resistant prism film may have a roughened or embossed pattern on one surface thereof to effectively conceal the outline of the light source. Further, the multilayer scratch-resistant prism film may reduce a degree of screen defect resulting from surface scratches or foreign matter, which may be formed during treatment or assembly of the prism film, such that the screen defect cannot be recognized by naked eyes, thereby preventing deterioration of image quality and other defects. Further, since the hard coating layer of the prism film may have a higher hardness than the base layer, it is possible to reduce scratches on the surface of the prism film during treatment or after assembly of the prism film.

According to another embodiment, the prism film may be formed by a melt-extrusion process or a melt co-extrusion process while passing through a gap between a prism roll and an emboss roll to form a prism pattern and an embossed pattern at the same time on opposite surfaces of the prism film, thereby simplifying the manufacturing process. Furthermore, the method may reduce manufacturing time and defect frequency, thereby improving productivity while decreasing manufacturing costs.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of extrusion molding a prism film, comprising:
   providing a molten film;
   simultaneously forming a prism pattern and an embossed pattern on opposite surfaces of the molten film by passing the molten film through a gap between a prism roll and an emboss roll; and
   cooling the molten film having the prism pattern and the embossed pattern on opposite surfaces thereof.

2. The method as claimed in claim 1, wherein the molten film is a monolayer film formed from a base layer melt.

3. The method as claimed in claim 1, wherein:
   the molten film is a double-layer film formed from a base layer melt having a first hard coating layer melt stacked on a surface thereof, and the prism pattern is formed on a surface of the base layer melt and the embossed pattern is formed on a surface of the hard coating layer melt.

4. The method as claimed in claim 3, wherein the base layer melt has a thickness of about 50 to about 150 μm and the first hard coating layer melt has a thickness of about 5 to about 150 μm.

5. A prism film produced by the method as claimed in claim 3, wherein:
the base layer melt has a thickness of about 50 to about 150 μm, and
the first hard coating layer melt has a thickness of about 5 to about 150 μm.

6. The method as claimed in claim 1, wherein:
the molten film is a triple-layer film formed from a base layer melt having a first hard coating layer melt stacked on a surface thereof and a second hard coating layer melt stacked on another surface of the base layer melt, the first and second hard coating layer melts themselves including surfaces, and
the prism pattern is formed on a surface of the second hard coating layer melt and the embossed pattern is formed on a surface of the first hard coating layer melt.

7. The method as claimed in claim 6, wherein the base layer melt has a thickness of about 50 to about 150 μm and the first and second hard coating layer melts each has a thickness of about 5 to about 150 μm.

8. A prism film produced by the method as claimed in claim 6, wherein:
the base layer melt has a thickness of about 50 to about 150 μm, and
the first and second hard coating layers each has a thickness of about 5 to about 150 μm.

9. The method as claimed claim 1, wherein the emboss roll has a surface roughness Ra of about 0.6 to about 4 μm and a height distribution index (HDI) of about 3.5 to about 10 μm.

10. The method as claimed claim 1, wherein the prism roll and the emboss roll are set at a temperature of about 120 to about 140° C.

11. The method as claimed claim 1, wherein the molten film includes a thermoplastic resin having a glass transition temperature of about 140° C. or greater.

12. The method as claimed claim 1, wherein the molten film includes a thermoplastic resin having a melt index (MI) of about 15 to about 100 at 250° C. and 10 kgf.

13. A prism film produced by the method as claimed in claim 1.

14. The prism film as claimed in claim 13, wherein an embossed pattern plane of the prism film has a surface roughness Ra of about 0.6 to about 4 μm and a height distribution index (HDI) of about 3.5 to about 10 μm.

15. The prism film as claimed in claim 13, wherein a prism pattern plane of the prism film has a transfer ratio of a prism height of about 85 to about 100% and includes a prism having a vertex rounded to have a radius of about 0 to about 20 μm.

16. The prism film as claimed in claim 13, comprising a thermoplastic resin having a glass transition temperature of about 140° C. or greater.

17. The prism film as claimed in claim 13, comprising a thermoplastic resin having a melt index (MI) of about 15 to about 100 at 250° C. and 10 kgf.

* * * * *